United States Patent
Nouveau et al.

[11] Patent Number: 6,165,586
[45] Date of Patent: Dec. 26, 2000

[54] FLAT STRIP, IN PARTICULAR FOR THE REINFORCING DUCTS, METHOD FOR MAKING SAME, AND DUCTS REINFORCED THEREWITH

[75] Inventors: Joël Le Nouveau, Yainville; Anh Tuan Do, Cormeilles en Parisis, both of France

[73] Assignee: Coflexip, France

[21] Appl. No.: 09/043,948

[22] PCT Filed: Sep. 18, 1996

[86] PCT No.: PCT/FR96/01453

§ 371 Date: Mar. 30, 1998

§ 102(e) Date: Mar. 30, 1998

[87] PCT Pub. No.: WO97/12753

PCT Pub. Date: Apr. 10, 1997

[30] Foreign Application Priority Data

Oct. 4, 1995 [FR] France ..................... 95 11676

[51] Int. Cl.[7] .............. B29C 70/22; B32B 5/12
[52] U.S. Cl. ............ 428/105; 156/178; 156/179; 428/107; 428/110; 428/111
[58] Field of Search ................. 428/105, 111, 428/110, 107; 156/178, 179

[56] References Cited

U.S. PATENT DOCUMENTS

| | | | |
|---|---|---|---|
| 2,129,110 | 9/1938 | Weaver | 428/105 |
| 4,664,961 | 5/1987 | Vees | 428/111 |
| 5,885,685 | 3/1999 | Tingley | 428/105 |

FOREIGN PATENT DOCUMENTS

| | | |
|---|---|---|
| 1582445 | 9/1969 | France . |
| 2160591 | 6/1973 | France . |
| 2677047 | 12/1992 | France . |
| 3246945 | 6/1984 | Germany . |

*Primary Examiner*—Nasser Ahmad
*Attorney, Agent, or Firm*—Ostrolenk, Faber, Gerb & Soffen, LLP

[57] ABSTRACT

A flat strip (1) including at least one layer (2) of longitudinal filamentary rovings (3), and means for assembling said filamentary rovings. The assembly means comprise a bonding material (5) and retaining means (4) surrounding and clamping said layer (2). The longitudinal filamentary rovings (3) are agglomerated into a relatively flat strand with a substantially rectangular cross-section, and each filamentary roving (3) has a predetermined average compactness of at least 60%. The retaining means (4) consist of a flat tubular sheath including elements (7) extending transversely to the longitudinal direction of said filamentary rovings (3). Said strip is particularly useful for reinforcing ducts used in the oil industry.

13 Claims, 5 Drawing Sheets

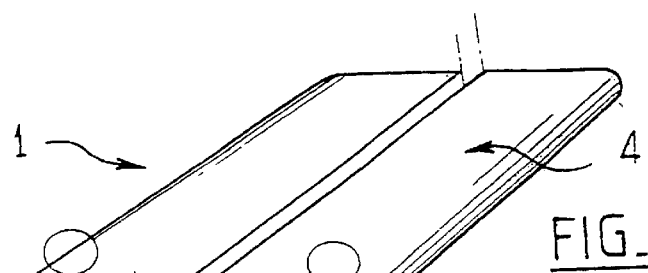
FIG_1
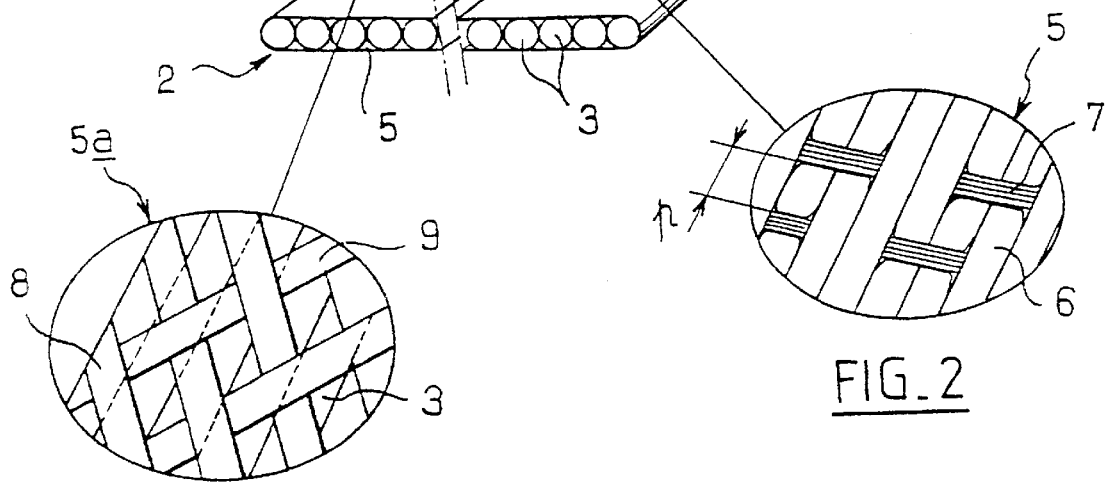
FIG_2
FIG_3
FIG_4
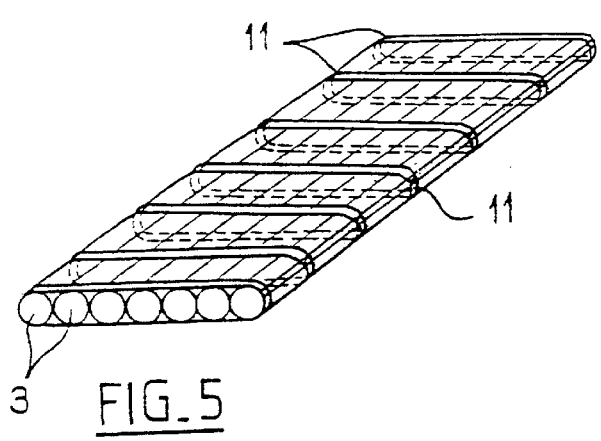
FIG_5
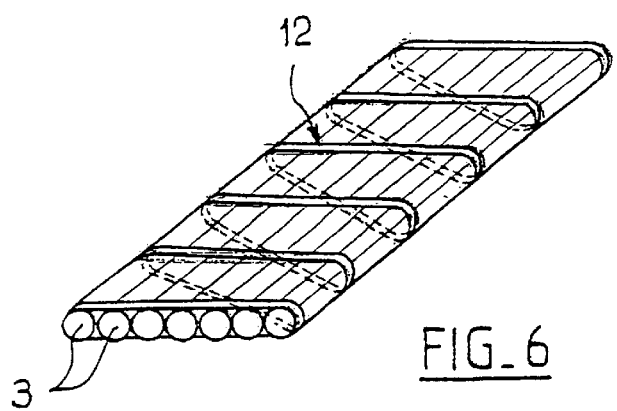
FIG_6

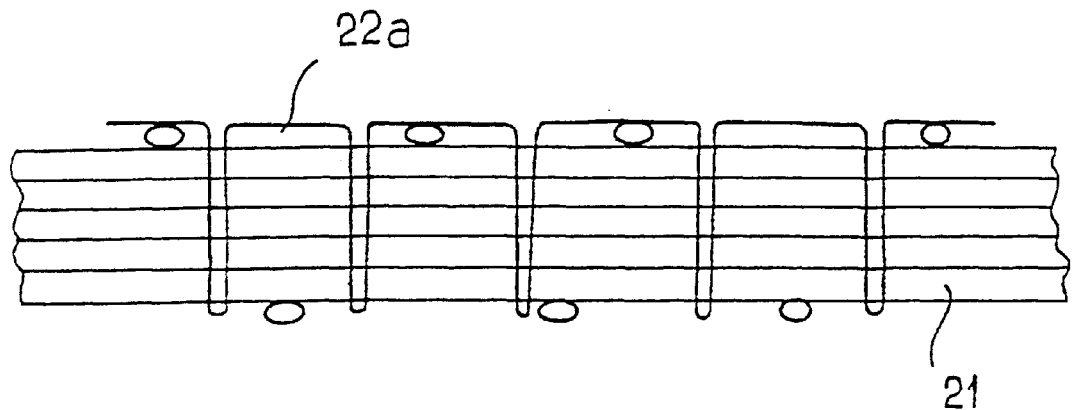
FIG_9a
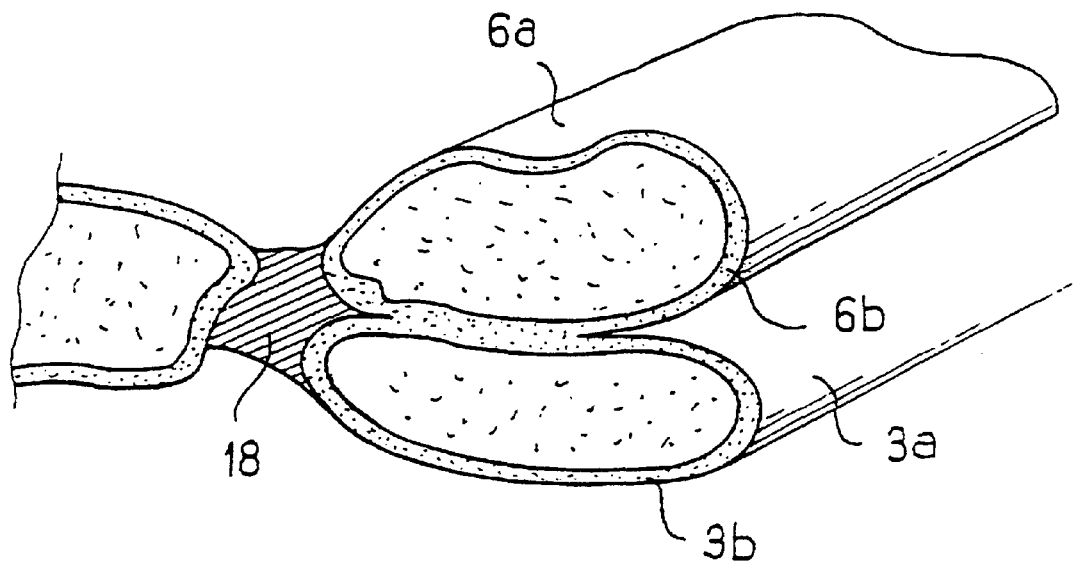
FIG_16

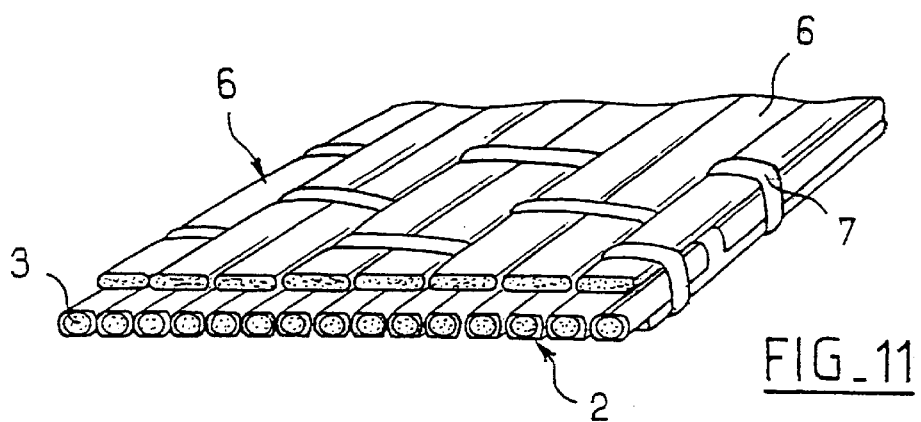
FIG_11
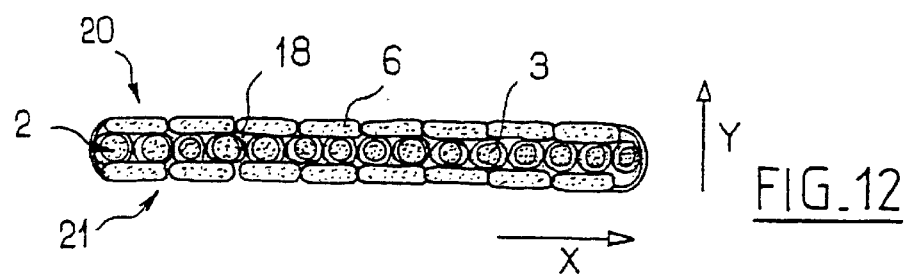
FIG_12
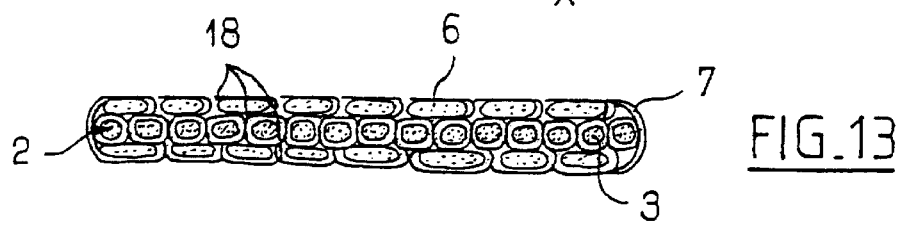
FIG_13
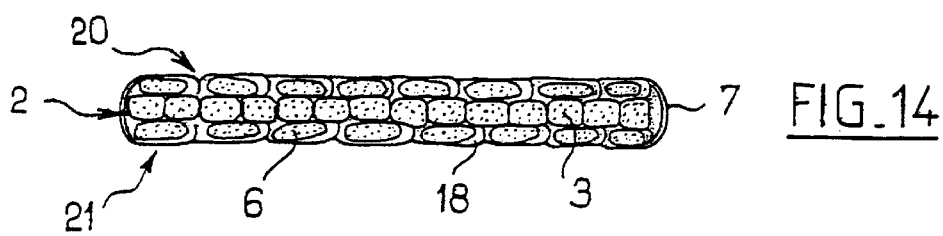
FIG_14
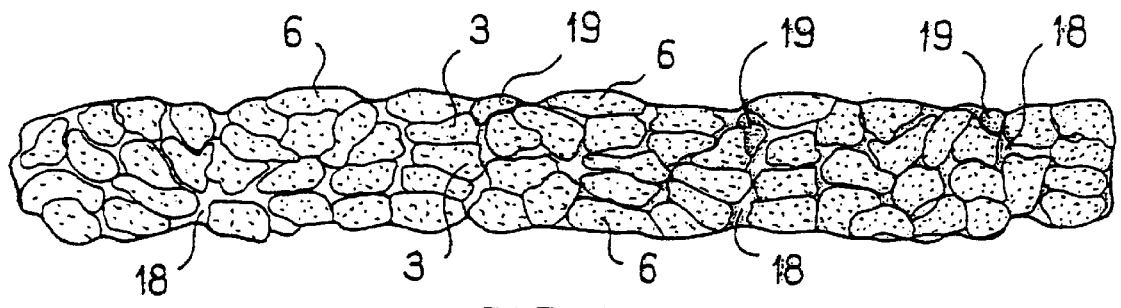
FIG_15

FLAT STRIP, IN PARTICULAR FOR THE REINFORCING DUCTS, METHOD FOR MAKING SAME, AND DUCTS REINFORCED THEREWITH

The present invention relates to a flat strip, in particular for reinforcing ducts, and to ducts reinforced by such strips.

An expedient use of the flat strip according to the invention is in the production of the reinforcements of a hose used in the oil industry.

BACKGROUND OF INVENTION

Strips or bands for specific uses are provided in the literature and in industry, each strip or band consisting of filamentary rovings made of synthetic or natural material, which are connected to one another either by means of a binding material, whatever the degree of impregnation of the said rovings, or by means of woven, braided, lapped or twisted textile threads.

The technique for the first category has the disadvantage of requiring a large proportion of material in order to ensure that the rovings are bound to one another. At the present time, the proportion of material is of the order of 50% by volume, even when the fibres within the rovings are impregnated only partially or not at all. This results in a limited performance in terms of maximum permissible resistance per unit of cross-section. This is especially the case with regard to profiles made of the composite material FRP (Fibre Reinforced Plastic), such as a composite consisting of glass fibre or aramide fibre and thermosetting or thermoplastic resin, and as regards strips consisting of a lap of juxtaposed parallel rovings (for example, made of aramide) which are contained in a thermoplastic mass, such as polyamide, the said mass being longitudinally and transversely continuous.

Other disadvantages described below have been encountered in the use of this technique, depending on the type of binding material. When the material is deformable, such as a thermoplastic, for example a polyamide, it does not ensure that the radial position of the rovings or their position in relation to one another is maintained sufficiently firmly when the strip is subjected to high traction, such as when it is wound around a duct. It has been found, in fact, that the tensioned filaments, while bearing on a curved support, tend to approach the supporting surface and to push the lower filaments radially and laterally in spite of the binding material. This results in the material experiencing a creeping effect under the influence of contact pressure exerted by the filaments. By contrast, when the material is not deformable, such as a thermosetting resin, for example epoxy resin, the strip is rigid and is therefore unsuitable for being wound around a duct.

With regard to the technique of the second category, there have been improvements in assembling longitudinal rovings more efficiently. Thus, in weaving, it has been proposed to add to or substitute for the weft threads threads which comprise heat-meltable material, the heat-sealing property of this material being revealed after weaving. The function of the heat-meltable material is to ensure the stability of the rovings relative to one another after the fabric has been cut, as described in the FR 2,577,946.

The FR 2,677,047 is also known, this describing a textile reinforcement in the form of a plane band intended for the production of complex laminated structures. The reinforcement comprises spaced longitudinal threads forming a unidirectional structure and a flattened tubular braiding forming a bi-directional structure which surrounds the longitudinal threads. It likewise comprises threads comprising heat-meltable material for binding the longitudinal threads in the manner of a loose woven weft. After thermal treatment, the heat-meltable material ensures that the longitudinal threads are held relative to one another and are connected to the tubular braiding.

The products described in the above patents are intermediate reinforcing products involved in the composition of a complex laminated structure, for example tubes made of the composite material FRP. They are put to use by being embedded in a thermosetting resin and forming the reinforcing element of the latter after the resin has been cured. As such, they must have bare warp or braiding threads in order to allow good bonding of the resin serving as a matrix for the laminated article.

It was found that assembling the rovings by means of the textile technique has several disadvantages. First of all, the type of assembly is adversely affected by a phenomenon of a shortfall in the resistance of the rovings. The shortfall expresses, as a percentage, a loss of strength of the rovings, when they are assembled, in relation to the strength of the roving taken individually. The shortfall is a parameter which increases with the number of rovings to be assembled and which depends on the assembly technique used. It is equivalent to a loss of overall efficiency of the strip which may exceed 30 to 40%, depending on the types of assembly. As well as this, there is an additional loss of efficiency when the strip is subjected to traction while bearing on a curved surface. In this case, the rovings are not all subjected to stress together to their maximum resistance (unequal tension). This loss can be compensated only by adding new rovings, thus entailing financial expense and even more unfavourable efficiency.

The above-described strips or bands have been proposed for reinforcing ducts instead of metallic reinforcements on account of their performances and lightness. The strips or bands are used in the duct in two main ways:

by circular braiding around a tubular support involved in the formation of the duct, by spiral winding in a plurality of superposed laps around the same tubular support, the said strips being crossed from one lap to the other (so-called crossed laps).

If appropriate, these rovings may be coated in the material, and the degree of coating of the filaments forming the rovings may vary, depending on the uses.

At the present time, there is a limitation to the diameter of the duct when the rovings are arranged by braiding. In fact, beyond a diameter of 40 mm, the means used for braiding assume considerable proportions on account of the number of bobbins and their dimensions.

There is another limitation as regards the performance of the ducts in terms of mechanical resistance under traction and under pressure. In fact, in order to obtain better performances, the tendency is to increase the number of rovings in the duct. This may typically be carried out by two means:

by increasing the number of superposed braidings or windings in the wall of the duct, by carrying out a preassembly of the rovings in sufficient numbers, before using them as a reinforcing element in the manufacture of the duct.

Experience has shown that the first means is unsatisfactory. It was found that, beyond two braidings and two pairs of crossed windings, the additional layers afford only a moderate contribution to the resistance of the duct.

As regards the second means, the various disadvantages recalled above in respect of the various techniques for assembling the rovings were found.

Another phenomenon adversely affecting textile assembly is the rotation of the ducts. In fact, it was found that ducts reinforced by being wound with conventional braided strips experience a rotational effect on their end when they are put under internal pressure and/or high tension. Such a phenomenon damages the ducts or makes it impossible to use them.

Damage was also found inside the strip or on its surface as a result of a phenomenon of abrasion which occurs when the duct is subjected dynamically to very high tensile, torsional or bending stresses. Such stresses arise, in particular, on ducts of the flexible hose type, when they undergo frequently repeated handling and laying operations or when they are used as a dynamic riser for the working of marine oil fields.

The disadvantages described above relate at least partially to elongate articles, such as hooping bands or strips, straps, flat ropes, belts and conveyer bands, when these are subjected, in particular, to tensile stresses while bearing on and around a curved surface.

The invention is therefore used preferably amongst the abovementioned articles or their equivalents.

SUMMARY OF THE INVENTION

An object of the present invention is to provide a flat strip which has optimum resistance to tensile stresses, particularly when it is wound around a curved surface.

Another object of the present invention is to provide a flat strip comprising essentially filamentary rovings which are held stably relative to one another, whatever the forces exerted on the said strip.

The subject of the present invention is a flat strip of the type comprising:
  at least one layer of longitudinal filamentary rovings,
  means for assembling the said filamentary rovings, the said assembly means comprising at least one binding material, characterized in that the assembly means comprise retaining means which are based on transverse elements and which are shaped so as to surround and clamp the said layer, the longitudinal filamentary rovings being agglomerated with one another in the form of a relatively flat bundle with a substantially rectangular cross-section, each filamentary roving having a specific average compactness of at least 60%.

By virtue of these characteristics, the strip is especially efficient in terms of tensile strength, particularly when it bears on the curved surface.

The rovings of the bundle having improved stability. In fact, the retaining means oppose the spreading of the rovings in the direction of the width of the strip, by causing dimensional blocking, whilst the binding material contributes to the stability of the assembly as a whole.

For reasons of the ease with which the said transverse elements are produced and their stability in relation to the bundle, binding material is arranged at least at the interface of the transverse elements and of the said bundle; according to a preferred characteristic, and in addition to or alternatively to the above characteristic, the binding material extends through the said bundle of filamentary rovings at least in the direction of its thickness; the retaining means are themselves produced in the form of a sheath or of a series of individual loops or of a series of turns based on the said transverse elements.

To avoid abrasion between the rovings of the bundle, these are coated with a binding material. Moreover, advantageously, it was found that there is an improvement in compactness within the said rovings, which may exceed 70%, and an improvement in their stability, that is to say in the longitudinal rovings being held relative to one another in the strip when it is bearing under tension on a curved surface, whatever the conditions of use of the strip according to the invention.

According to one characteristic of the invention, the proportion of binding material in the strip is not more than 40%. By virtue of this characteristic, an excellent compromise is thus obtained between tensile strength, the stability of the rovings and high flexibility, the flexibility allowing the strip to be wound around a curved surface.

Another subject of the invention is a method making it possible to manufacture a strip according to the invention which is also resistant to abrasion between the rovings of the bundle.

The method is characterized in that:
  a surface coating of at least part of the filamentary rovings with a binding material is carried out;
  the longitudinal filamentary rovings of the bundle are held tensioned under a controlled load while the retaining means are wound around the said rovings, and
  the bundle thus assembled is compressed while the binding material is activated.

The advantage of this method is, in particular, that it makes it easier to introduce the binding material into the strip.

Another subject of the invention is a first use of the strip as a reinforcing strip for flexible ducts, thus making it possible to produce large-diameter ducts optimized in terms of mechanical resistance. Moreover, it is possible to control the harmful effects, such as the rotation of the flexible duct and the abrasion of the strips. The result of this, in particular, is that the pressure permissible in the large-diameter ducts is increased considerably.

Another expedient use of the strip according to the invention is to employ it in conveyer bands or as a hooping strip, strap, flat rope, belt or equivalent.

BRIEF DESCRIPTION OF DRAWINGS

Other advantages and characteristics will emerge more clearly from a reading of several embodiments of the present invention and from the accompanying drawings in which:

FIG. 1 is a diagrammatic perspective view of part of the strip according to one embodiment of the invention, FIG. 2 is a partial enlarged plan view of an embodiment of the retaining sheath illustrated in FIG. 1, FIG. 3 is a partial enlarged plan view of another embodiment of the retaining sheath illustrated in FIG. 1, FIG. 4 is a partial enlarged sectional view of another embodiment of the retaining sheath illustrated in FIG. 1, FIG. 5 is a diagrammatic perspective view of part of the strip according to a second embodiment, FIG. 6 is a diagrammatic perspective view of part of the strip according to a third embodiment, FIGS. 11 to 14 are perspective and sectional views of another embodiment of the strip according to the invention, FIG. 15 is a highly enlarged view of the strip according to a preferred embodiment of the invention, FIG. 16 is an enlarged cross-sectional view of the part of the strip according to the invention.

DETAILED DESCRIPTION

Figure 7:
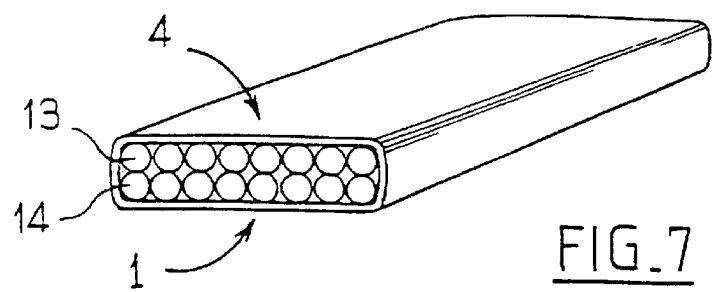
FIG. 7 is a diagrammatic perspective view of part of the strip according to the invention, but comprising two layers of filamentary rovings.

According to the invention, the strip comprises at least one layer of longitudinal filamentary rovings and means for assembling these rovings. The assembly means comprise at least one binding material which impregnates the filamentary rovings at least in places, as described below.

In FIG. 1, the strip 1 according to a first embodiment comprises a single layer 2 of longitudinal filamentary rovings 3 which, according to the invention, are agglomerated with one another and which are maintained in this agglomerated state in the form of a flat bundle and with a substantially rectangular cross-section by retaining means 4 which form part of the means for assembling the rovings, in the same sense as the binding material.

Within the meaning of the invention, by rovings is meant a set or group of continuous threads twisted or not twisted together, each thread being capable of being a monofilament or a set of continuous or discontinuous fibres or filaments assembled, in particular, by twisting or spinning. A group of continuous twisted or non-twisted filaments is commonly known as a roving. If appropriate, a roving may be obtained by assembling a plurality of elementary rovings, for example by twisting or simply by a parallel grouping of a plurality of elementary rovings.

In the example, each longitudinal roving is composed of continuous aramide filaments grouped together by twisting. Although preference is given to rovings of an industrial nature, made of aramide, carbon, glass, extra-linear polyethylene, metallic, ceramic, etc., the invention also applies to other less efficient materials, such as polyester.

According to one characteristic of the invention, the retaining means are based on oblique or straight transverse elements, that is to say they comprise such elements, so as to retain and clamp the filamentary rovings of the flat bundle in a compressed state, each filamentary roving having a specific average compactness of at least 60%. They mainly oppose the spreading effect of the rovings in the direction of the width of the strip by causing dimensional blocking.

Within the meaning of the invention, the elements contained in the retaining means may be continuous threads, monofilaments, filamentary rovings, as defined above, traditional components of non-woven fabrics or else a mixture of monofilaments and of filamentary rovings, the respective proportions being determined as a function of the uses of the strip and of the mechanical properties which it must possess in such use.

Preferably, the rovings of the bundle are in longitudinal contact with one another, that is to say they are longitudinally contiguous. This means that, preferably, the rovings are not separated either by elements within the meaning of the invention, such as interlacings of a weaving or, in a borderline case, by a large quantity of binding material. In fact, interlacing the rovings causes the bundle to experience shortfall and a large quantity of binding material reduces the overall compactness of the strip.

By contrast, any interlacing or any binding material which causes little or no modification with regard to the shortfall of the bundle and to the overall compactness of the strip is capable of fulfilling the objectives of the invention. This applies particularly to the interlacing of a fine thread made of heat-meltable material or comprising the said material, the latter subsequently melting into the rovings during the preparation of the strip.

Consequently, according to a preferred characteristic of the invention, the rovings of the central bundle are free of elements which interlace them.

In the examples of FIGS. 1 to 4, the retaining means consist of a tubular retaining sheath 4 which comprises transverse elements and within which the filamentary rovings 3 are arranged.

According to a preferred embodiment, a binding material is arranged at least at the interface between the retaining sheath 4 and the filamentary rovings 3, the said binding material being, for example, a thermoplastic, so as to bind the sheath to the rovings by impregnating their respective surfaces.

The retaining sheath 4 of FIG. 2 consists of a flattened tubular fabric of the warp-and-weft type. Transverse elements 7 substantially perpendicular to the longitudinal direction of the strip form the weft, whilst rovings 6 substantially parallel to the rovings 3 of the bundle 2 form the warp. The weft 7 interlaces the warp 6, whilst at the same time surrounding the rovings 3 of the bundle 2.

In this example, the weft and the warp consist of a filamentary roving, although they may each consist of a continuous thread or filament of equivalent resistance.

Preferably, the weft is spaced at a loose pitch p greater than 5 times its diameter. Good results were found with a pitch equal to approximately 10 times its diameter.

In FIG. 3, the retaining sheath 4 consists of a fabric of the flattened tubular braiding type. Transverse elements 8, 9 criss-crossed obliquely relative to one another are used for producing the braiding. They likewise consist, in this example, of rovings within the meaning of the invention. In the same way as before, these elements may be continuous monofilaments or threads having a resistance equivalent to that of the criss-crossing rovings. They may likewise be spaced at the same pitch p as above.

In FIG. 4, the sheath 4 based on transverse threads is a non-woven tubular sheath. The components 10 of the non-woven fabrics may be continuous or discontinuous fibres, filaments or threads which are assembled in a known way in order to form a non-woven.

In the example, the elements are fibres 10 of a preferred length greater than 5 mm.

The transverse elements forming the non-woven may be spaced in such a way that the non-woven sheath has a covering rate on the bundle of filamentary rovings of the same order of magnitude as that obtained as a result of the spacing present between the elements 8 or 9 or 7 of FIGS. 3 and 2 or the spacing present between the elements 11, 12 of FIGS. 5 and 6.

FIGS. 5 and 6 illustrate variants of the retaining means. In FIG. 5, at least one transverse element forms a series of individual loops 11, whilst, in FIG. 6, it forms a series of turns 12. The loops 11 or turns 12 surround and clamp the layer of rovings 3, at the same time being distributed over the entire length of the bundle in a way equivalent to the retaining sheath described above. They are produced from a filamentary roving, although a thread or monofilament of the same resistance as the roving may be suitable as an alternative.

The value of the spacing between two loops or turns may correspond to the above-defined pitch p.

The binding material is likewise arranged at the interface of the loops 11 or turns 12 and the filamentary rovings 3.

In the example, the binding material is advantageously carried by the loops 11 or turns 12 so as to form a sheathing of the transverse elements, although it may be carried solely by the longitudinal rovings 3, thereby forming a sheathing prior to their assembly, or else both by the transverse elements 11 or 12 and by the longitudinal rovings 3.

In general terms, the retaining means 4 are designed to retain at least one bundle 2 in a compressed state. The compressed state may occur either during the below-described manufacture of the strip 1 or during its use when it is subjected to tensile stress during or after winding around a curved surface.

In both cases, the rovings of the bundle are compressed in the direction of the thickness of the strip and tend, under this effect, to spread laterally in the direction of the width of the strip.

The retaining means, composed, for example, of a sheath based on one or more transverse threads, oppose the lateral spreading of the rovings in as much as they retain the bundle within an initial predetermined perimeter. The transverse threads of the sheath are then subjected to tensile stress and cause a reaction around the bundle, the said reaction tending to compress the rovings on themselves or at least in the direction of width (transverse direction), compression in the direction of thickness being mainly carried out, on the one hand, by calendering and, on the other hand, during use. There is therefore compression of the rovings 3 both in the direction of the thickness of the strip 1 and in the direction of its width.

In the two cases mentioned above, some rigidity under traction and transverse resistance of the transverse elements, particularly of the sheath 4, are utilized in order to retain and clamp the rovings 3 and oppose their lateral displacement.

In practice, this rigidity and transverse resistance will determine the type and number of the basic elements forming the sheath 4 and their arrangement (for example, the pitch value).

Thus, for example, the material of the basic transverse element may be of the polyester type, when the compression of the rovings 3 is not too high in the two cases described above. For greater resistance, use may be made of basic elements of the same type as the filamentary rovings 3 of the bundle 2, in particular made of aramide, glass, carbon, ceramic, etc.

However, basic elements having a high modulus of elasticity are preferred. It was found that the stability of the rovings 3 is improved all the more if the perimeter of the sheath is invariable.

For example, carbon threads are suitable for forming a retaining sheath within the meaning of the invention. They are highly resistant, and they also have very low elongation at break.

FIG. 7 illustrates a strip 1 comprising a bundle consisting of two rows 13, 14 of filamentary rovings. In order to avoid a recovery of volume of the strip 1 in the direction of its thickness perpendicularly to the surface of the latter, the strip 1 comprises additional assembly means. In the example of FIG. 7, these means consist at least of binding material carried longitudinally by the rovings 3 of the bundle. In addition to the function of binding the rovings, the binding material also serves for increasing the crushing resistance of the strip, in as much as the said binding material is substituted for the air trapped between the two rows 13, 14 of rovings. In other words, the binding material contributes to reducing the deformation amplitude of the strip 1 under stress in the direction of its thickness and in the direction of its width.

The binding material also contributes to stabilizing the rovings relative to one another (radial and/or lateral displacement) when the strip is under tensile stress, while bearing on and around a curved surface.

It was found that the rovings are liable to migrate within the strip in spite of the presence of the sheath. This occurs, in particular, when the strip, free of binding material in the roving bundle, is subjected for a long time to high and variable tensile stresses, while bearing on and around a curved surface.

In this case, a reorganization of the rovings within the strip by migration may occur, as explained above.

The binding material is selected from the materials capable of binding the rovings directly or indirectly by physical and/or chemical adhesion and of following their deformation, particularly in terms of elongation. It was found that materials having a hardness of up to approximately 60 Shore D were suitable in a strip comprising bundle rovings made of aramide.

The binding material may be selected from thermoplastics, such as polyamides, polyolefines, vinyls and fluorinated thermoplastics, in particular thermoplastic copolymers and elastomeric thermoplastics, or else from elastomers, such as natural or synthetic rubber, polyurethane, and silicone. Thermosetting plastics, such as PTFE and some polyurethanes, may also be considered, provided, however, that they are used in a small proportion so as to preserve flexibility in the strip.

Thermoplastics are preferred because they are easy to use in the manufacture of the strip.

Figure 8:
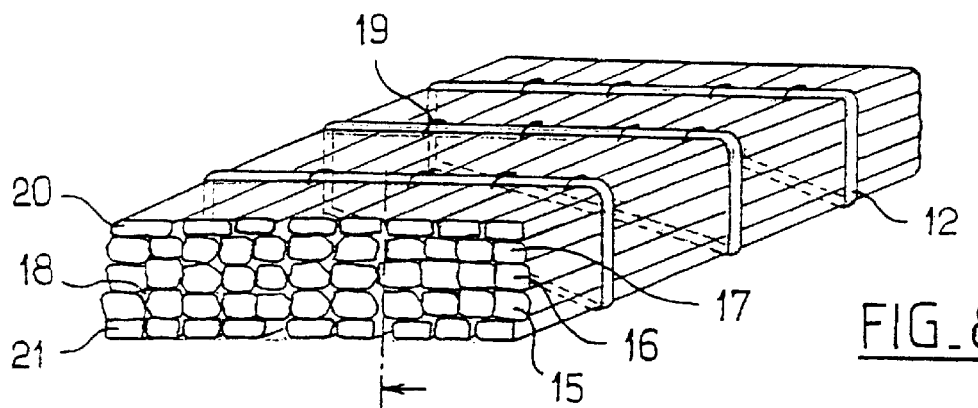
FIGS. 8 to 10 are diagrammatic perspective and side illustrations of another embodiment of the strip according to the invention.

FIG. 8 illustrates the situation where the number of rows of the bundle becomes greater, for example three rows 15 to 17, the retaining means consisting of turns 22. Provision may be made for completing the assembly means (sheath 4 and binding material 18) by connecting elements 19, 22 in order to connect the upper 20 and lower 21 surfaces of the strip through the bundle of longitudinal rovings. In this example, the connecting elements are filamentary rovings within the meaning of the invention, although continuous threads or monofilaments are also suitable. When the retaining thread describes turns 12 (FIG. 9), the connecting element 19, 22 advances in the longitudinal direction, passing alternately above and below the turns. In other words, the connecting elements straddle the transverse threads, such as the turns 12, in the manner of a stitched seam. A textile structure of the 2.5 D type is thus obtained. If the retaining thread describes loops (FIG. 10), the strip may comprise two connecting threads 19, 19a catching alternately on the upper thread of a first loop, then the lower thread of a second consecutive loop, and so on and so forth.

These connecting elements tend to bring the upper and lower surfaces of the strip nearer to one another during its manufacture. They therefore contribute mainly to stabilizing the strip in its thickness against a possible recovery of volume in the direction perpendicular to the surfaces 20 and 21.

According to one embodiment, the connecting elements pass through the strip in the manner of a needling thread 22a, as illustrated in FIG. 9a which shows another embodiment.

The connecting threads 22a or 19, 22 may carry the binding material or another additional binding material. They may be of the core/sheath type, the sheath being a thermoplastic coating. They may also be made entirely of thermoplastic, the entire thread being heat-meltable. In general terms, the binding material may be carried solely or non-solely by the said connecting thread.

Figure 9:
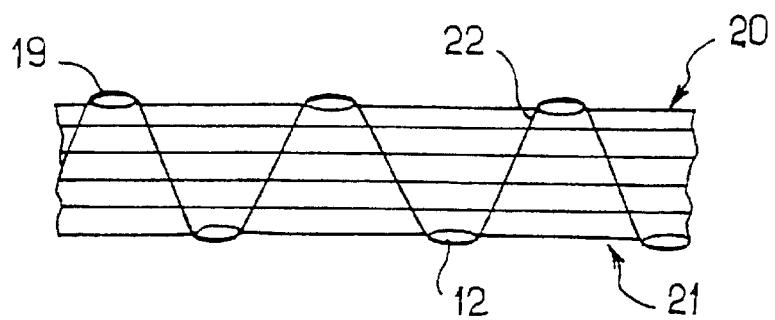
Figure 10:
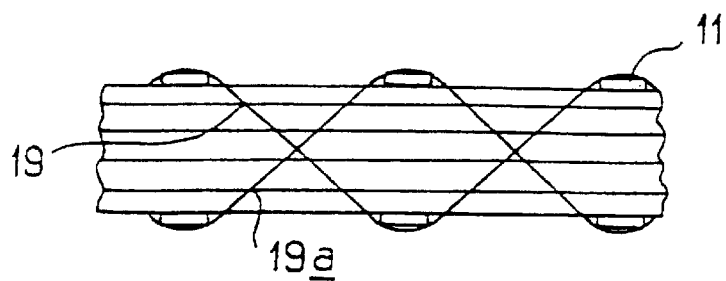

It is found that, when the binding material is carried by the said connecting elements, it extends through the said bundle of filamentary rovings in the direction of its thickness, and this may take place either obliquely, in the case of the stitched seam illustrated in FIG. 9 or 10, or vertically, in the case of the needling illustrated in FIG. 9a.

FIG. 11 shows an embodiment according to FIG. 2. This embodiment is advantageous in as much as it comprises a sheath consisting mainly of longitudinal threads which contribute to the tensile strength of the strip. It is easy to see that the warp threads 6 are flattened in the direction of thickness Y (vertically), whilst the rovings 3 of the bundle 2 are compressed on themselves in two directions X and Y, X being the direction of width.

In a variant (FIGS. 11 and 12), the binding material 18 is arranged solely around the rovings 3 of the central bundle 2. According to this variant, the upper 20 and lower 21 surfaces of the strip are held close to one another by means of the binding material, the latter being in contact with the two surfaces 20 and 21.

FIG. 13 illustrates an embodiment, in which the binding material 18 is arranged around the warp threads 6 of the retaining sheath 4 and around the rovings 3 of the bundle 2. The properties of the strip thus designed, with at least one coating of the threads 6 and the rovings 3, are particularly efficient, both in terms of traction and in terms of the relative stability of the rovings 3 between themselves, as shown by the test results presented below. In this embodiment, the weft threads 7 of the retaining sheath 4 are not coated.

FIG. 14 illustrates an embodiment, in which the binding material 18 is arranged solely around the warp threads 6 forming the retaining sheath 4. This strip has dimensional stability in respect of a recovery of volume in terms of thickness after a compression and heating operation, in as much as the upper and lower surfaces are connected together by means of a layer of rovings 3 of the central bundle 2.

In general terms, in all the embodiments in which the rovings 3 of the bundle 2 are coated, the threads forming the retaining sheath 4 or the turns 12, 22 or the loops 11 or the said connecting elements 19, 19a may be not coated with material. This has the advantage of eliminating at least one coating operation.

In any use in which the retaining sheath 4 is subjected to dynamic contact with other strips or other abrasive surfaces, it is expedient to have a surface covering of a material with a low coefficient of friction around the strip. The covering may be carried out before or after the preparation of the strip. When it is carried out beforehand, for example for economic reasons, each thread 6, 7 or 8, 9 or 10 and 11 forming the retaining sheath 4 is coated in the same way as the rovings 3 of the bundle 2. By contrast, when it is carried out afterwards, the covering can be produced by any known covering method, such as spraying, immersion, pultrusion, sheathing, packing.

The surface covering can advantageously give the strip a smoothed surface and a strictly rectangular cross-section. This is especially expedient when the strip is used for hooping articles or flat ropes, etc.

Likewise, in the case of a dynamic use of the band, internal abrasion between the rovings forming the bundle is avoided by sheathing them with a material having a low coefficient of friction, such as thermoplastic. This operation is carried out before the assembly of the rovings.

A method for manufacturing the strips is described below:

A plurality of longitudinal rovings 3 are held tensioned under a controlled load in a conventional weaving and braiding installation and advance linearly while the retaining element is wound around.

The advance of the retaining thread is carried out according to the following embodiments of the sheath.

According to that of FIG. 3, at least one retaining element 8 is crossed with at least one other 9 around the rovings 3 by the conventional braiding technique.

According to that of FIG. 2, at least one weft thread 7 advances around the bundle 2, at the same time producing a weaving reinforcement with longitudinal threads 6 parallel to the rovings 3 of the bundle 2. Preferably, the weft 7 is woven at a pitch of the order of half a centimetre.

According to that of FIG. 5, the sheath thread 10 produces loops in proportion as the rovings 3 of the bundle 2 advance longitudinally.

According to that of FIG. 6 the sheath thread 11 is wound around the bundle 2 during a longitudinal advance of the latter.

According to that of FIG. 4, a strip of the non-woven type is wound spirally around the rovings 3 of the bundle 2 by the lapping technique.

According to that of FIG. 8, a plurality of longitudinal stitched seams 19 (four in the example) forming the connecting elements 19 are produced in proportion as the rovings 3 of the bundle and the weft advance.

Preferably, the retaining element is arranged around the rovings, these being grouped beforehand so as to define a bundle cross-section of minimal perimeter, for example substantially circular or square.

After the sheath has been arranged around the bundle 2, whatever the embodiment, the strip is subjected to an operation during which it is compressed between the two surfaces 20, 21 while the binding material 18 is activated. Preferably, the strip is also tensioned longitudinally while it is being compressed. The binding material 18 may be carried by the threads of the sheath and/or by the filamentary rovings of the bundle and/or by the connecting elements 19, 19a, that is to say by any one of the categories of element forming the strip. If the binding material is a thermoplastic in particular, activation is of the thermal type, so as to bring the material into the melted state. Such an operation may be carried out traditionally by calendering or hot drawing.

It was found that it was advantageous to use rovings sheathed in thermoplastic, the surface sheathing or coating being obtained typically by extrusion. On the one hand, the rovings already have high compactness by being sheathed, which goes towards the result sought by the invention, and, on the other hand, the said sheathing or coating makes easier the operation of obtaining close weaving. Moreover, the sheathing reduces friction in the weaving looms.

Advantageously, the rate of binding material in the strip may be reduced by sheathing only some of the longitudinal rovings of the bundle, for example one out of two, or by sheathing a part of the rovings which is located, for example, mid-way along the strip in its width, so as to have, in the middle of the strip, binding material which extends through the bundle in the direction of thickness.

A strip having a structure according to the invention is illustrated on an enlarged scale in FIG. 15. It comprises 66 threads 6 and longitudinal rovings 3 made of aramide, each of 3300 dtex. The bundle comprises 49 rovings 3, whilst the sheath according to FIG. 2 comprises 17 warp threads 6 distributed around the bundle. A weft thread (not visible), made of aramide and of equal linear density, connects the warp threads 6 at a loose pitch of 0.5 cm. The strip also comprises four connecting threads 19 of 1170 dtex, spaced uniformly over the width of the strip. They are arranged so as alternately to connect the upper and lower pass of the weft around the bundle.

All the threads were coated with a copolyamide surface coating before the manufacture of the strip. Before calendering, the bundle comprises two rows of 24 and 25 threads, the said rows being superposed one on the other.

After calendering and thermal treatment, a strip having a cross-section of 16 mm×2 mm (the cross-section of the enveloping rectangle) was obtained.

The strip then consists of some agglomeration of threads, binding material and air and has the appearance of a mosaic in cross-section. The threads are compressed and aggregated in the direction of thickness, whilst others are more compressed in the direction of the width of the strip. The binding material is localized at the interface of the threads and on the periphery of the threads according to a gradient decreasing in the direction of the centre of the threads. The air is located in the central zone of the threads.

The average compactness thus obtained was 640 tex/mm$^2$, but an average compactness higher than 550 tex/mm$^2$ would be suitable. It is well above the compactness of a traditional textile strip, which is generally at best between 400 and 500 tex/mm$^2$.

The tests conducted on the strip showed a breaking resistance of 34,250 N and consequently a tenacity of 157 centinewton/tex. Comparing this result with the tenacity of an aramide thread of 3300 dtex which is equal to 203 CN/tex, it emerges that the assembly of 66 threads in the form of a strip according to the invention has a shortfall of only 23%. As a comparison, an assembly of circular cross-section, composed of 24 aramide rovings of 3300 dtex, which was tested under identical conditions, had a shortfall of 39%. Another assembly of circular cross-section, consisting of 48 aramide rovings, each of 3300 dtex, and of a plastic sheath of 0.3 mm, likewise had a shortfall of 39%.

An image analysis of the cross-section of the strip, conducted with the aid of "PHOTOSHOP" and "OPTILAB" image-processing equipment and software, made it possible to determine the proportions of the components of the strip.

For sheathed filamentary rovings, an apparent coefficient of volume of fibres in the roving of 84% at the centre of the strip and of 65% on its periphery is obtained, that is to say an average coefficient of 74%, this coefficient, known as compactness, being obtained by the ratio of the total area of the fibres of a roving to the area occupied by the roving. Since an average coefficient of rovings in the strip measured is 69%, an average coefficient of fibres in the strip of 51% is obtained.

The average coefficient of binding material located between the rovings represents 31% (100%–69%) of the cross-sectional area of the strip, the air being contained solely in the rovings and the binding material being mainly located between the rovings and to a little extent in the rovings as a result of the impregnation of the filaments located on the periphery.

It also emerges that the average coefficient of air in the rovings, with the strip being at rest, is 100%–74%=26%, and that the average coefficient of air in the strip is 18% (26%×69%).

For the sake of simplification, the above values are calculated without taking into account the binding material located in the rovings.

In general terms, the proportions of the various components of the strip which are likely to be suitable are indicated below.

If the longitudinal rovings are not sheathed with binding materials:

the coefficient of fibres in each roving of the central bundle: higher than approximately 60%, the coefficient of fibres in the strip being higher than approximately 50%.

If the longitudinal rovings are sheathed with binding material, the proportions then become:

the coefficient of fibres in each roving of the central bundle: 60 to 90%, preferably higher than 70%, the coefficient of fibres in the strip being higher than approximately 40%, preferably higher than 50%, binding material: 5 to 40%, preferably 20 to 35%, air in each roving of the central bundle: 5% to 40%, preferably 15 to 30%.

Of course, the proportion of one of the components of the strip in relation to the others may vary as a function of the rate of penetration of the binding material in the filamentary rovings.

According to FIG. 16, the product obtained has a cellular structure in cross-section, each cell 6a or 3a extending longitudinally in the strip. The wall 3b or 6b of each cell corresponds to the periphery of each roving 3 or 6. The nature of the wall 6b is akin to a composite consisting of the binding material and of fibres in respective proportions of the order of 35% and of 65%. The cells 6a are connected to one another by means of binding material 18 without fibres or by means of a portion of their respective wall. The thickness of this wall 6b is variable; it corresponds to the depth of penetration of the binding material in each roving. The depth of penetration is such that the cross-sectional area of the wall represents approximately 5 to 30% of the area of each roving and, on average, is of the order of 10%.

It can be seen that, in the assembly, each roving is in contact with at least one other roving, so as to have a common wall portion. On average, each roving is in contact with at least two other rovings.

In other words, in this example, no roving is completely isolated from the other rovings by a binding material which is free of fibres and which surrounds it completely.

It can be seen that, in this particularly advantageous embodiment, the binding material is not only arranged at the interface of the said retaining means, in this instance a sheath and the longitudinal filamentary rovings of the bundle, but it also extends through the said bundle by travelling through the cells. This travel takes place in the direction of the thickness and of the width of the strip. Excellent stability of the rovings is thereby obtained, whatever the conditions of use of the strip.

Conversely, it can be seen that each roving also comprises a wall portion connected to at least one wall of another roving by means of binding material free of fibres.

Still referring to FIG. 16, as regards the example on which the above-described tests were conducted, it was measured that:

the binding material in the strip was approximately 32.8%, the air in the roving was approximately 23.5%, the air in the strip was approximately 16.2%, on consideration of an average coefficient of fibres in the roving of approximately 74%.

By virtue of the invention the strips have a reduced thickness due to the compactness obtained. This results in high performances, described above, in terms of maximum permissible stress when the strip is subjected to traction linearly.

The performances of the strip are even more remarkable, as compared with those of the strips of the prior art, when it bears on a curved surface. In this case, the longitudinal rovings cannot all be stressed together to their maximum resistance, since they are not equally tensioned. The strip according to the invention is hardly affected by that, in as much as it is designed to have optimum compactness. It is thereby especially suitable for obtaining high resistance in terms of absolute value.

In other words, due to its structure and compactness, the invention makes it possible to reduce not only the shortfall, but also the lack of equal tension, each being responsible for a shortfall in efficiency which is linked directly to the increase in the number of rovings in the strip.

Thus, the optimization of the strip, translated into values, means that there are the following highest ratios:

linear efficiency ratio: $R_r/nR_f$ in which $R_r$ is the resistance of the strip, $R_f$ is the resistance of a roving, and n is the number of longitudinal rovings in the strip, the strip being subjected to linear traction.

wound efficiency ratio ($R_{re}/n.R_f$), in which $R_{re}$ is the resistance of the wound strip, the strip being subjected to traction, while bearing on a curved surface.

Figure 17:
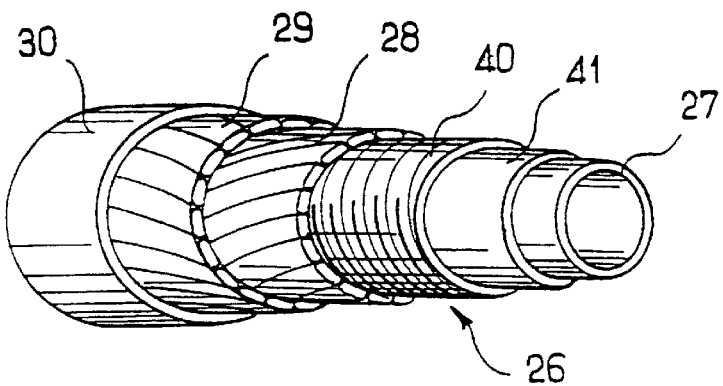
FIGS. 17, 17a and 18 are perspective views of two types of flexible hose.
Figure 18:
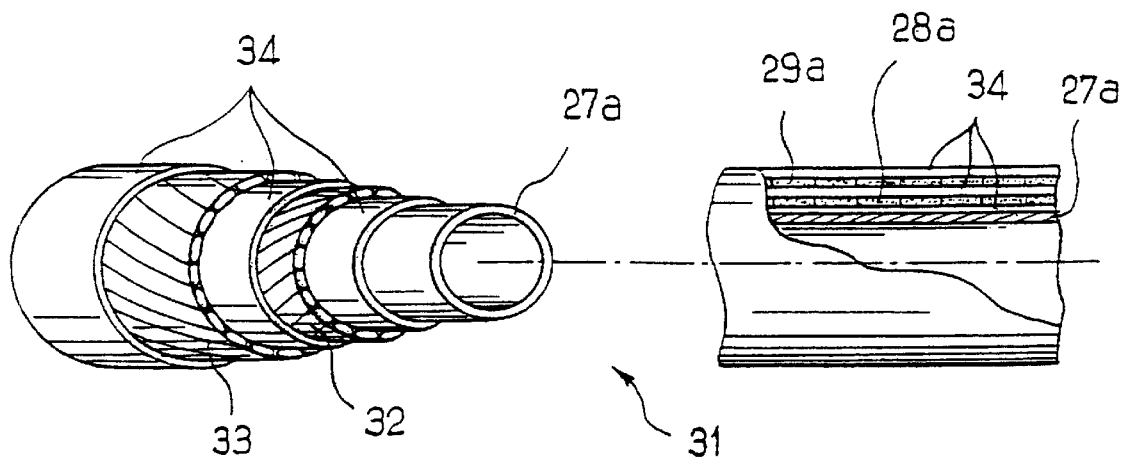

A first use of the strip according to the invention as a reinforcing strip for a flexible duct, as illustrated in FIGS. 17 to 18, will now be described.

A flexible duct typically comprises the following tubular layers from the centre outwards:

optionally, a non-leaktight metallic casing of the flexible metal tube type, for example consisting of stapled hooping, a sealing sheath made of polymeric material, optionally, and as a function of the internal pressure, a reinforcing layer consisting of stapled metal wires wound at a low pitch (for example, a reinforcing angle of 80° relative to the central axis), called a pressure arch, which ensures resistance to the stress induced circumferentially by the pressure (hoop stress), two superposed laps of metallic reinforcing threads or strips arranged helically around the preceding layer (crossed laps). The angle of the helix relative to the central axis may typically be of the order of 55°, when there is no pressure arch, or below 55°, for example 30°, in the case of a flexible duct with a pressure arch. These laps are commonly referred to as traction reinforcement.

an outer protective sheath made of polymeric material.

According to the API (American Petroleum Institute) designation, a flexible duct is called "bonded" when it comprises a plurality of individually wound and extruded layers which are then connected together by means of adhesive or unified under the effect of temperature and/or pressure, and it is called "nonbonded" when it consists of a plurality of individual layers separated from one another without adhesion, each layer being wound or extruded over the layers located underneath by means of a continuous method over the entire length of the duct.

As regards a flexible duct of the "bonded" type, the reinforcing laps may be coated with adhesion-promoting material. This duct may likewise comprise an inner casing which may or may not be connected to the adjacent layer by means of the adhesion-promoting material.

In general terms, the invention applies to flexible ducts 26 which completely or partially comprise the above layers of conduits of known types, the strip according to the invention advantageously being substituted for the metallic reinforcing strip. They comprise at least (FIG. 17):

an inner tubular part 40, 41, 27 capable at least of supporting the winding of the strips when they are placed under tension during the reinforcing operation, at the time of manufacture. This inner tubular part comprises an especially polymeric or metallic sealing layer 41 which is windable and has, for example, a corrugated wall, and, depending on the intended uses, it may comprise, furthermore, another layer, such as a pressure arch 40, and/or another layer, such as a metal casing 27, making it possible to lead to conduits of the "rough-bore" type.

a reinforcement consisting of two superposed strip laps 28, 29 crossed one on the other, an outer protective sheath 30 being capable of being applied, depending on the particular uses.

Figure 17A:
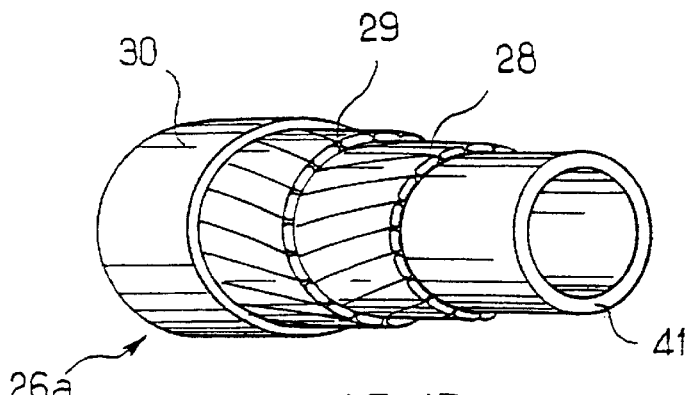

FIG. 17A shows diagrammatically a flexible duct 26a, called "smooth-bore", of the "non-bonded" type, comprising an inner tube 41 made of polymeric material, two reinforcing laps 28 and 29 and an outer protective sheath 30.

Each reinforcing lap 28, 29 consists of a plurality of strips according to the invention, which were described above.

FIG. 18 shows a duct 31 of the "bonded" type which conforms to the ducts of the invention. It comprises two reinforcing laps consisting of strips 32, 33 conforming to that of the invention, the said strips being arranged in the form of two crossed laps coated with an adhesion-promoting material 34. The adhesion-promoting material 34 forms a lower, intermediate and upper layer in relation to the laps. The duct may or may not comprise a casing 27a, depending on whether it is of the "rough-bore" or "smooth-bore" type.

According to a variant of the ducts of FIGS. 6 and 7, the tapes are replaced by a braiding. This results respectively in a duct with braided reinforcement of the "bonded" and "non-bonded" type.

If appropriate, the reinforcing strip according to the invention may also be used solely as a reinforcing element resistant to the circumferential stresses induced by the internal pressure (pressure arch not illustrated). In this case, it is wound at a low pitch in a way identical to the arch 40 of FIG. 17, for example at a reinforcing angle of 85° in relation to the longitudinal axis of a duct.

During hot-compression tests aimed at achieving optimum compactness of a strip conforming to that of the example (FIG. 15), it was found that the binding material tends to penetrate into each roving from its periphery. It was also found that, by making penetration more intensive or making it last for a longer time, a profile of the FRP type of a homogeneous nature, with a distribution of fibres in the binding material, is obtained.

As regards the object of the invention, such a strip has excessive rigidity and has excessive resistance or breaks under bending. It is therefore advisable to limit the penetration of the binding material in the roving and keep the air in the roving at a proportion of at least approximately 5%, preferably 15% to 30%. The flexibility thus obtained is satisfactory, even when a plurality of laps of longitudinal rovings are superposed in the thickness of the strip.

It was also inferred from the above result that it is appropriate to produce a strip according to the invention in such a way that its crushing rigidity and its compactness, whilst being high, still intentionally fall short of the values which will be obtained if the rovings were impregnated completely with binding material, without air being present. The result of this is that the crushing rigidity of the strip and its compactness increase and may attain an optimum level in proportion as it is wound during the reinforcing operation, the latter being carried out under tension. Thus, once the strip has been wound, the coefficient of fibres in the rovings becomes higher than 70% and may be close to the theoretical maximum of the order of 90%, depending on the tensile force exerted on the winding. It becomes easier to wind the strip because it contains air in reduced quantity (23.5% of air in the rovings of the central bundle in the example).

It was also found that, the more compact the strip was at rest in relation to the known strips, the less it was necessary to tension it during winding in order to achieve a predetermined compactness. This means that the force exerted on the tubular inner layer during reinforcement is all the lower because the strip is compact at rest.

The result of this is that the strip has the advantage of being capable of being used on ducts which have low crushing resistance (collapse), for example flexible ducts free of a casing. In other words, by virtue of the strip of the invention, the thickness of a tubular inner layer can be reduced. This applies particularly to a polymeric tube, on which reinforcement is carried out.

Advantageously, the strip according to the invention has limited and controllable broadening when it is used in a flexible duct. In this respect, it is expedient to point out that the broadening of the strips causes them to overlap one another when they are wound contiguously or with little play. The overlaps are harmful because:

they reduce the resistance of the reinforcing lap, they cause disturbance in the geometry of the lap, they are responsible for poor dynamic functioning of the duct, they induce considerable lateral friction in the reinforcements.

We claim:

1. A flexible flat strip, comprising:
    at least one layer of longitudinal filamentary rovings agglomerated with one another in the form of a relatively flat bundle with a substantially rectangular cross-section;
    a retaining sheath surrounding and clamping the layer of filamentary rovings; and
    a binding material arranged at least at the interface of the retaining sheath and the longitudinal filamentary rovings;
    wherein the retaining sheath comprises connecting elements connecting the upper and lower surfaces of said flat strip through the bundle of longitudinal rovings over the entire length of said flat strip,
    wherein each longitudinal filamentary roving has a global average compactness of at least 60% and a maximum void percentage of 15%, and
    wherein the flexible flat strip, after compression, has a shortfall lower than 25%.

2. The flat strip according to claim 1, characterized in that the retaining sheath is woven, and the warp elements thereof are substantially parallel to the longitudinal filamentary rovings and the weft elements are substantially perpendicular to the warp elements.

3. The flat strip according to claim 1, characterized in that the longitudinal filamentary rovings are coated with binding material which represents a proportion by volume of the strip which is at most 40%.

4. The flat strip according to claim 1, characterized in that each connecting element forms a longitudinal stitched seam.

5. The flat strip according to claim 1, characterized in that each connecting element passes through the strip vertically in the manner of a needling thread.

6. The flat strip according to claim 1, characterized in that each connecting element is coated with a binding material.

7. The flat strip according to claim 1, characterized in that each connecting element is made of thermoplastic binding material.

8. A method for manufacturing the strip according to claim 1, comprising the steps of:
    surface coating of at least part of the filamentary rovings with a binding material is carried out,
    the longitudinal filamentary rovings of the bundle are held tensioned under a controlled load while at least one retaining sheath is arranged around the said rovings, and
    the bundle thus assembled is compressed while the binding material is activated.

9. The method according to claim 8, characterized in that the binding material is a thermoplastic, and in that the compression of the assembled bundle is carried out by hot calendering or in a hot-drawing operation.

10. A flexible duct comprising a reinforcement, characterized in that the said reinforcement consists of at least one strip according to claim 1.

11. The flexible duct according to claim 10, characterized in that the reinforcement comprises at least two superposed laps each consisting of a plurality of strips wound spirally in opposite directions.

12. The flexible duct according to claim 11, characterized in that the laps of the reinforcement are crossed at 55°.

13. The flexible duct according to claim 10, characterized in that the reinforcement consists of braided strips.

* * * * *